United States Patent
Cho et al.

(10) Patent No.: US 10,123,176 B2
(45) Date of Patent: Nov. 6, 2018

(54) LOCATION ESTIMATION APPARATUS AND METHOD USING COMBINATION OF DIFFERENT POSITIONING RESOURCES

(71) Applicant: Electronics and Telecommunications Research Institute, Daejeon (KR)

(72) Inventors: Young-Su Cho, Daejeon (KR); Joo-Young Kim, Daejeon (KR); Ju-Il Jeon, Daejeon (KR); Myung-In Ji, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/401,585

(22) Filed: Jan. 9, 2017

(65) Prior Publication Data
US 2017/0201865 A1    Jul. 13, 2017

(30) Foreign Application Priority Data
Jan. 12, 2016    (KR) .................. 10-2016-0003861

(51) Int. Cl.
*H04W 4/02*    (2018.01)
*H04L 12/24*    (2006.01)

(52) U.S. Cl.
CPC ........... *H04W 4/026* (2013.01); *H04L 41/145* (2013.01)

(58) Field of Classification Search
CPC ...... G01S 5/0294; G01S 11/02; G01S 5/0289; G01S 5/02; G01S 5/0242; G01S 5/0278;
(Continued)

(56) References Cited

U.S. PATENT DOCUMENTS

2012/0154824 A1    6/2012    Kim et al.
2013/0273939 A1    10/2013    Cho et al.
(Continued)

FOREIGN PATENT DOCUMENTS

| KR | 101264306 B1 | 5/2013 |
| KR | 1020130091082 A | 8/2013 |

(Continued)

OTHER PUBLICATIONS

Wendlandt et al. "Continuous location and direction estimation with multiple sensors", Sep. 3-6, 2006, 2006 IEEE International Conference on Multisensor Fusion and Integration for Intelligent Systems.*

*Primary Examiner* — Allahyar Kasraian
(74) *Attorney, Agent, or Firm* — William Park & Associates Ltd.

(57) ABSTRACT

Disclosed herein are a location estimation apparatus and method using a combination of different positioning resources. The location estimation apparatus includes a motion model generation unit for generating a motion model corresponding to a state variable of a terminal based on a current time, a weight calculation unit for extracting a dynamic location database (DB) from a location DB based on multiple pieces of measurement information received from the terminal, and calculating a weight proportional to a likelihood of the multiple pieces of measurement information based on the dynamic location DB, and a location estimation unit for estimating a location and direction of the terminal by applying the weight to at least one sample value corresponding to the motion model.

16 Claims, 6 Drawing Sheets

(58) Field of Classification Search
CPC . G01S 5/14; H04W 4/04; H04W 4/02; H04W 64/00; H04W 4/008; H04W 4/028; H04W 4/043; H04W 4/026; H04W 4/027; H04W 4/00; G01C 21/206; G01C 21/165; G01C 21/30; G01C 21/005; G01C 21/20; G01C 21/00
USPC .............................................. 455/456.1–457
See application file for complete search history.

(56) References Cited

U.S. PATENT DOCUMENTS

| | | | |
|---|---|---|---|
| 2014/0129175 A1* | 5/2014 | Poduri | H04W 4/029 702/141 |
| 2015/0005000 A1* | 1/2015 | Gyorfi | H04W 64/006 455/456.1 |
| 2015/0189478 A1 | 7/2015 | Ji et al. | |
| 2015/0230058 A1 | 8/2015 | Cho et al. | |
| 2015/0282111 A1* | 10/2015 | Yang | H04W 64/00 455/456.1 |

FOREIGN PATENT DOCUMENTS

| | | |
|---|---|---|
| KR | 1020150080817 A | 7/2015 |
| KR | 1020150094434 A | 8/2015 |

\* cited by examiner

LOCATION ESTIMATION APPARATUS AND METHOD USING COMBINATION OF DIFFERENT POSITIONING RESOURCES

CROSS REFERENCE TO RELATED APPLICATION

This application claims the benefit of Korean Patent Application No. 10-2016-0003861, filed Jan. 12, 2016, which is hereby incorporated by reference in its entirety into this application.

BACKGROUND OF THE INVENTION

1. Technical Field

The present invention generally relates to location estimation technology using a combination of different positioning resources and, more particularly, to a location estimation apparatus and method using a combination of different positioning resources, which can estimate the location of a terminal based on a value obtained by combining the likelihoods of pieces of positioning information having different dimensions.

2. Description of the Related Art

Positioning technology using wireless communication infrastructure is present in various forms depending on the type of infrastructure and the range of service.

For example, a Global Navigation Satellite System (GNSS) denotes a system for determining the location of a user using signals of satellites in orbit around the Earth. As examples of this system, the U.S. Global Positioning System (GPS), the Russian Global Navigation Satellite System (GLONASS), European Galileo, etc. are currently operated or are expected to be operated. GNSS is deployed to service the entire area of the earth and is composed of a satellite unit for transmitting signals including precise time information and information about the orbits of satellites, a reception unit for receiving at least four satellite signals and calculating a location and a speed, and a ground control unit for monitoring and controlling the states and orbits of the satellites.

The GNSS provides high location accuracy and availability in which errors of 10 m or less occur on a plane or a suburban area in which direct lines of sight of the satellite unit and the reception unit are acquired. However, in a congested metropolitan area corresponding to a Non-Line of Sight (NLOS) area, there is a disadvantage in that a location error rises to 50 m due to multi-path errors, and, especially in indoor areas, it is impossible to determine a location and a speed because reception sensitivity is deteriorated and, consequently, signals cannot be acquired.

Further, "cellular-based positioning technology" refers to technology for determining the location of a user using the location information and measurement signals of a mobile communication base station. In detail, cellular-based positioning technology is classified into Cell-ID, Enhanced-Observed Time Difference (E-OTD), and Advanced-Forward Link Trilateration (AFLT) depending on the number of base stations from which a terminal is capable of receiving signals. Due to the characteristics of mobile communication infrastructure, having most urban and suburban areas as a service range, cellular-based positioning technology is advantageous in that the location may be determined even in indoor areas as well as in outdoor areas. However, it is difficult to apply such cellular-based positioning technology to indoor/outdoor navigation services which require a location accuracy of about several meters because the precision of positioning varies according to the density of deployment of base stations, and a relatively low location accuracy is realized, in which an average error of about 100 to 800 m occurs.

Furthermore, "Assisted GNSS" refers to technology for acquiring assistive information from a positioning server so as to improve the minimum reception signal sensitivity of a GNSS receiver contained in a user terminal device and shorten the initial location determination time (Time to First Fix). Assisted-GNSS enables fast location determination using a GNSS in a congested metropolitan area corresponding to a weak signal environment, but it is impossible to obtain a major improvement because signal strength is very low in indoor areas.

Furthermore, "Wi-Fi-based positioning technology" refers to a method for overcoming difficulties in indoor positioning, and may be representatively classified into a method for calculating the location of a terminal using the location and measurement signals of a Wi-Fi Access Point (AP) and a fingerprinting method using a radio map of the Wi-Fi AP. In this case, the method using the location and measurement signals of the Wi-Fi AP estimates the location of a target Wi-Fi AP using collection locations on a vehicle or a pedestrian at which signals are collected and received signal strengths (RSSI) of respective Wi-Fi APs, and calculates the location of a terminal by applying the estimated location of the target Wi-Fi AP to a positioning algorithm such as Trilateration, Weighted Centroid Localization (WCL), or Monte-Carlo. Further, the fingerprinting method generates a radio-map for a reference location by processing collection locations on a vehicle and a pedestrian and received signal strengths of respective Wi-Fi APs. Finally, the reference location having the minimum error in the received signal strength is estimated to be the location of the terminal by comparing the corresponding radio-map with the patterns of received signal strengths for respective Wi-Fi APs measured by the terminal.

When the results of analysis are aggregated, Wi-Fi-based positioning technology may provide precise location information of a terminal in an indoor environment compared to existing GNSS and cellular-based positioning technology. However, since the existing Wi-Fi-based positioning technology has difficulty in providing direction information (heading information) which is additional useful information in addition to the location information, it is not easy to filter abnormal location information. Further, in a walking environment using a terminal, a pedestrian moves more freely than when in an airplane or a vehicle, thus making it difficult to apply a formulated motion state equation to the walking environment.

Meanwhile, sensor-based positioning technology has technical features that mitigate the disadvantages of Wi-Fi-based positioning technology in an indoor environment. Basically, sensor-based positioning technology denotes technology for calculating the location of a terminal by combining one or more of an accelerometer, a gyroscope, a magnetometer, a barometer, an inclinometer, and a proximity sensor, which are provided inside or outside the terminal.

Such sensor-based positioning technology is advantageous in that that, first, it is almost completely uninfluenced by the external environment of the terminal, unlike GPS or Wi-Fi-based positioning technology. That is, since the location of the terminal is calculated using the internal physical features of a sensor (e.g. acceleration, velocity, rotational speed, etc.) as direct measurement information, there is a low probability that the corresponding measurement information will be distorted due to a complicated indoor environment. Second, even if positioning infrastructure is not present near the terminal, positioning of the terminal is always possible. That is, in the case of Wi-Fi-based positioning technology, positioning of the terminal is possible only in an environment in which a Wi-Fi AP is installed even in a given building, and thus it is impossible to perform positioning in an area in which a Wi-Fi AP is not installed. However, sensor-based positioning technology may always load sensor information and calculate the location of a terminal as long as a sensor is connected to the terminal, thus increasing the availability of the location information of the terminal. Third, recently, with the development of Micro Electro-Mechanical Systems (MEMS) technology and the popularization of smart phones, the price of sensors has greatly decreased. This phenomenon enables the mounting of sensors in smart phones to be further universalized, and thus combination with existing GPS technology is facilitated through such sensor mounting.

However, this sensor-based positioning technology also has problems to be solved. First, for sensors to which MEMS technology is applied, the quality of the sensors is not high. Thus, a calibration procedure for eliminating sensor error components occurring due to bias or drift must be essentially performed before the sensors are used. When this calibration procedure is not successfully performed, location error in a terminal, which is calculated using measurement information, greatly increases with the passage of time. Further, since error values attributable to bias or drift are different from each other in respective environments (e.g. temperature, etc.) in which the sensor or terminal is used, calibration must be able to be separately performed for each individual terminal that is used. Second, sensor-based positioning technology performs relative positioning rather than absolute positioning, and thus the absolute location of the terminal can be known only when the absolute location of a starting point (origin) is known. In order to overcome this disadvantage, combination with GPS, which is capable of providing an absolute location, is required. Third, sensor-based positioning technology may provide the precise location of the terminal for a long period of time only when accumulated location error is eliminated via a correction task that is performed during positioning, as well as a calibration task that is performed before positioning is started. The correction of the terminal is also implemented using location information from the GPS, which is capable of providing an absolute location, and Points of Interest (POI) in a map may be utilized for correction.

In connection with this, Korean Patent Application Publication No. 10-2015-0080817 discloses a technology related to "Apparatus and method for loading radio map database, and terminal device."

SUMMARY OF THE INVENTION

Accordingly, the present invention has been made keeping in mind the above problems occurring in the prior art, and an object of the present invention is to estimate the location of a terminal by efficiently combining positioning resources having different dimensions with each other in a positioning algorithm.

Another object of the present invention is to shorten the time required to estimate the location of a terminal by limitedly calculating a dynamic location database (DB) corresponding to the current terminal from an existing location DB based on predetermined criteria.

A further object of the present invention is to more precisely estimate the location of a user terminal by reducing an error corresponding to the difference between a measurement information collection terminal and the user terminal.

In accordance with an aspect of the present invention to accomplish the above object, there is provided a location estimation apparatus using a combination of different positioning resources, including a motion model generation unit for generating a motion model corresponding to a state variable of a terminal based on a current time; a weight calculation unit for extracting a dynamic location database (DB) from a location DB based on multiple pieces of measurement information received from the terminal, and calculating a weight proportional to a likelihood of the multiple pieces of measurement information based on the dynamic location DB; and a location estimation unit for estimating a location and direction of the terminal by applying the weight to at least one sample value corresponding to the motion model.

The weight calculation unit may include a measurement information correction unit for generating multiple pieces of corrected measurement information by correcting the multiple pieces of measurement information in accordance with a collection terminal corresponding to the location DB based on a measurement information correction DB for each terminal; and a likelihood combination unit for combining multiple individual likelihoods for the multiple pieces of corrected measurement information, respectively, based on a preset combination formula, and calculating a combined likelihood of the multiple pieces of measurement information.

The multiple individual likelihoods may be calculated by comparing first measurement information-based lists, acquired based on any one reference location closest to a location corresponding to the motion model, with second measurement information-based lists, acquired based on the multiple pieces of corrected measurement information and by utilizing list information that matches between the first and second measurement information-based lists.

The weight calculation unit may further include a dynamic location DB extraction unit for extracting, from the location DB, the dynamic location DB that satisfies a dynamic condition that is preset based on averages and standard deviations of respective pieces of measurement information corresponding to the multiple pieces of measurement information.

The measurement information correction DB for each terminal may include at least one of bias and a scale factor of received values for respective pieces of measurement information measured at an identical location in different types of terminals.

The weight calculation unit may further include a measurement information collection unit for storing the multiple pieces of measurement information by temporally synchronizing collection locations at which the multiple pieces of measurement information are collected with at least one of wireless communication infrastructure information and sensor information that are included in the multiple pieces of measurement information.

The motion model generation unit may generate the motion model based on at least one of a probability-based motion model and a sensor-based motion model.

The preset dynamic condition may correspond to at least one of a case where at least one reference location included in the location DB falls within a reference range preset around a location of the terminal based on the multiple pieces of measurement information and a case where a standard deviation of the location of the terminal based on the multiple pieces of measurement information falls within a preset threshold range.

In accordance with an aspect of the present invention to accomplish the above object, there is provided a location estimation method using a combination of different positioning resources, including generating a motion model corresponding to a state variable of a terminal based on a current time; extracting a dynamic location database (DB) from a location DB based on multiple pieces of measurement information received from the terminal, and calculating a weight proportional to a likelihood of the multiple pieces of measurement information based on the dynamic location DB; and estimating a location and direction of the terminal by applying the weight to at least one sample value corresponding to the motion model.

Calculating the weight may include generating multiple pieces of corrected measurement information by correcting the multiple pieces of measurement information in accordance with a collection terminal corresponding to the location DB based on a measurement information correction DB for each terminal; and combining multiple individual likelihoods for the multiple pieces of corrected measurement information, respectively, based on a preset combination formula, and then calculating a combined likelihood of the multiple pieces of measurement information.

The multiple individual likelihoods may be calculated by comparing first measurement information-based lists, acquired based on any one reference location closest to a location corresponding to the motion model, with second measurement information-based lists, acquired based on the multiple pieces of corrected measurement information and by utilizing list information that matches between the first and second measurement information-based lists.

Calculating the weight may further include extracting, from the location DB, the dynamic location DB that satisfies a dynamic condition that is preset based on averages and standard deviations of respective pieces of measurement information corresponding to the multiple pieces of measurement information.

The measurement information correction DB for each terminal may include at least one of bias and a scale factor of received values for respective pieces of measurement information measured at an identical location in different types of terminals.

Calculating the weight may further include storing the multiple pieces of measurement information by temporally synchronizing collection locations at which the multiple pieces of measurement information are collected with at least one of wireless communication infrastructure information and sensor information that are included in the multiple pieces of measurement information.

Generating the motion model may be configured to generate the motion model based on at least one of a probability-based motion model and a sensor-based motion model.

The preset dynamic condition may correspond to at least one of a case where at least one reference location included in the location DB falls within a reference range preset around a location of the terminal based on the multiple pieces of measurement information and a case where a standard deviation of the location of the terminal based on the multiple pieces of measurement information falls within a preset threshold range.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
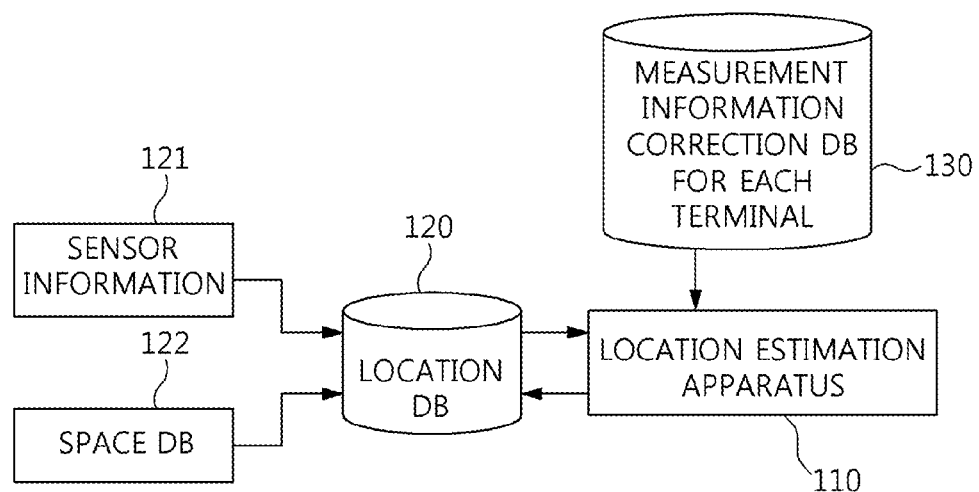
FIG. 1 is a diagram showing a location estimation system using a combination of different positioning resources according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a location estimation system using a combination of different positioning resources according to an embodiment of the present invention.

Referring to FIG. 1, the location estimation system using a combination of different positioning resources according to the embodiment of the present invention includes a location estimation apparatus 110, a location database (DB) 120, and a measurement information correction DB 130 for each terminal.

The location estimation system according to the embodiment of the present invention may more efficiently calculate and estimate the location of the terminal of a user by filtering and combining pieces of measurement information received from the user terminal.

When a location in an indoor area is measured using existing location estimation technology, it is difficult to estimate a precise location because the probability of an error in a signal propagation model such as a Wi-Fi AP or a Bluetooth beacon is high because indoor structures are complicated and users tend to walk around. Further, when the signal characteristics and sensor reception characteristics between a collection terminal for constructing a location DB through preliminary collection for indoor positioning and the user terminal differ from each other, a likelihood estimate of the corresponding measurement information may be inaccurate.

Therefore, the location estimation system according to the present invention is intended to provide location estimation technology that enables real-time calculation processing to be performed in the terminal by nondimensionalizing pieces of measurement information having different dimensions based on a terminal location filter, which utilizes a particle filter or the like, in the form of a probability density function, and by dynamically adjusting the size of the location DB.

For this, the location estimation apparatus 110 according to the present invention may generate a motion model corresponding to the state variable of the terminal. For example, the sample of the motion model corresponding to the location and direction (heading) of the terminal may be generated using a probability-based motion model and a sensor-based motion model.

Thereafter, the weights to be applied to the sample of the motion model may be calculated using multiple pieces of measurement information received from the terminal.

Here, the location estimation apparatus 110 may extract a dynamic location DB from the location DB 120 based on the multiple pieces of measurement information which are stored such that collection locations, wireless communication infrastructure information, and sensor information are temporally synchronized with each other.

The location DB 120 may be constructed based on sensor information 121 and a space DB 122, which are received from at least one collection terminal.

The dynamic location DB may be a DB generated by dynamically extracting only a part satisfying a predetermined condition from the location DB 120. That is, the term "dynamic" means that information in the location DB corresponding to the terminal is variable depending on the time-varying condition of the terminal.

Thereafter, the location estimation apparatus 110 may calculate individual likelihoods for pieces of measurement information, corresponding to multiple pieces of measurement information, based on the dynamic location DB.

The multiple pieces of measurement information are pieces of measurement information collected from the terminal of the user, and the location DB may be constructed based on the pieces of information collected through the collection terminal. Therefore, in order to eliminate an error that may occur due to the difference between the measurement information chipsets of two terminals, the multiple pieces of measurement information collected from the user terminal may be collected based on the measurement information correction DB 130 for each terminal.

Then, individual likelihoods may be calculated by comparing multiple pieces of corrected measurement information with measurement information corresponding to the reference location closest to the sample of the motion model in the dynamic location DB.

Thereafter, weights proportional to the likelihood obtained by combining individual likelihoods for pieces of measurement information corresponding to multiple pieces of measurement information, that is, individual likelihoods for pieces of measurement information having different dimensions, may be calculated.

Here, the weights may be normalized such that the sum of the weights is 1.

Thereafter, the location and direction of the terminal may be estimated by applying weights to the sample of the motion model. For example, depending on the probabilities proportional to the weights, new particles to be included in a particle set corresponding to the sample of the motion model may be calculated depending on the probabilities proportional to the weights. Thereafter, the location and direction of the terminal may be calculated using the average of the locations and directions of the new particles.

Figure 2:
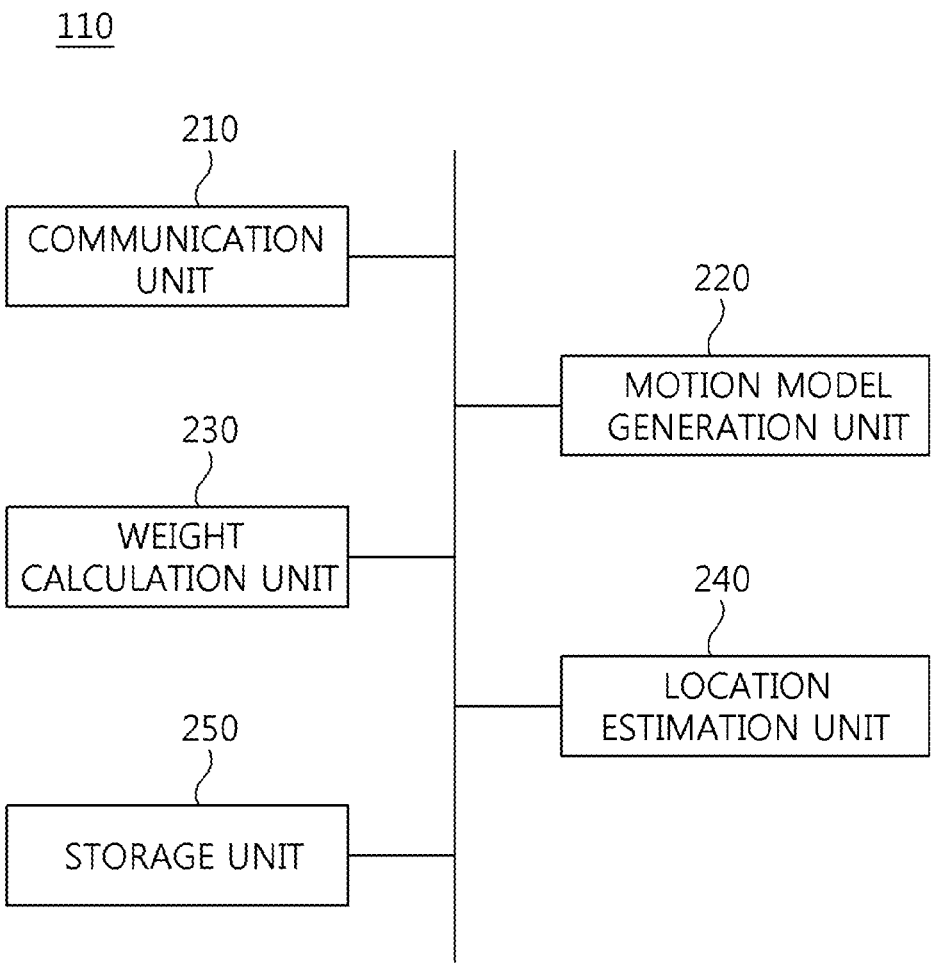
FIG. 2 is a block diagram showing an example of the location estimation apparatus shown in FIG. 1.

FIG. 2 is a block diagram showing an example of the location estimation apparatus shown in FIG. 1.

Referring to FIG. 2, the location estimation apparatus 110 shown in FIG. 1 includes a communication unit 210, a motion model generation unit 220, a weight calculation unit 230, a location estimation unit 240, and a storage unit 250.

The communication unit 210 functions to transmit and receive data required to estimate the location of the terminal. In particular, the communication unit 210 according to the embodiment of the present invention may receive multiple pieces of measurement information from at least one terminal and provide information about the estimated location of the terminal to the location DB.

The communication unit 210 may transmit and receive data over a network.

Here, the network is intended to provide a path through which data is transferred between the user terminal and the location estimation apparatus 110, and is a concept including all existing networks that have been conventionally used and networks that may be developed in the future. For example, the network may be any one of a wired/wireless location area network (LAN) for providing communication between various types of information devices in a limited area, a mobile communication network for providing communication between moving objects and between a moving object and the outside of the moving object, a satellite communication network for providing communication between individual earth stations using satellites, and a wired/wireless communication network, or a combination of two or more thereof. Meanwhile, transfer mode standards of the network are not limited to existing transfer mode standards, but may include all transfer mode standards to be developed in the future.

The motion model generation unit 220 generates a motion model corresponding to the state variable of the terminal based on the current time.

In this regard, the motion model may be a movement model corresponding to the state variable of the terminal during a period from a time previous to the current time to the current time. For example, assuming that the current time is t, the motion model may be a movement model corresponding to the location and direction of the terminal during a period from time t−1, which is a previous time, to the current time t.

Here, the motion model may be generated based on at least one of a probability-based motion model and a sensor-based motion model.

The probability-based motion model may be a model obtained by individually defining the state transition probabilities of the terminal via statistical modeling. For example, assuming that the current time is t, the motion model may be obtained by defining the motional state, positional state, or directional state of the terminal from the previous time t−1 to the current time t via statistical modeling.

Therefore, the probability-based motion model is advantageous in that it may be implemented easily even if the precision of the model may be deteriorated because measurement information related to the actual movement of a pedestrian is not observed.

Meanwhile, the sensor-based motion model may be a model obtained by relatively accurately predicting the motion of a motion model in a short period of time by means of Pedestrian Dead Reckoning (PDR) technology, which uses actual measurement sensor information when a sudden change of direction occurs, as in the case of a pedestrian, or when a great change in motion state appears for a certain entity. Here, the actual measurement sensor information may be sensor information measured using a sensor such as an accelerometer, a gyroscope, or a magnetometer.

Here, the mobility terminal according to the present invention may use any type of method capable of describing the mobility characteristics of the terminal without being limited to a specific method.

In this case, a typical mathematical model for generating a motion model according to an embodiment of the present invention is given in the following Equation (1):

$$P(x_t|x_{t-1},u_t) \qquad (1)$$

where $x_t$ may denote the location and direction information at the current time t, and $u_t$ may denote motion information corresponding to the current time t.

The weight calculation unit 230 extracts a dynamic location DB from the location DB based on multiple pieces of measurement information received from the terminal, and calculates weights proportional to likelihoods of multiple pieces of measurement information based on the dynamic location DB. That is, the weight calculation unit 230 may calculate the probabilities that multiple pieces of measurement information received from the terminal will be present at the current time from the state variable of the terminal corresponding to the current time, and may calculate weights in proportion to the probabilities.

Here, the multiple pieces of measurement information may include at least one of one or more pieces of wireless communication infrastructure information and sensor information that may be received from the terminal.

In this way, a typical mathematical model indicating multiple pieces of measurement information according to the present invention may correspond to Equation (2):

$$P(z_t|x_t^m) \qquad (2)$$

where $z_t$ may denote measurement information at the current time t. That is, the measurement information may mean all available information that can be received from the terminal of the user and that can be used to estimate the state variable of the terminal, and there may be multiple pieces of measurement information for each type of measurement information.

Here, collection locations at which the multiple pieces of measurement information are collected may be stored in synchronization with at least one of wireless communication infrastructure information and sensor information, which are included in the multiple pieces of measurement information.

For example, the multiple pieces of measurement information may include collection locations, Media Access Control (MAC) information and Received Signal Strength Indicator (RSSI) information for each Wi-Fi AP, collection directions, the relative locations of start and end points of collection, intensities and directions along 3 axes of a magnetometer, the atmospheric pressure of a barometer, etc.

Here, the collection directions may be an absolute orientation based on a collection path. Therefore, the collection direction may be collected once whenever the direction of the collection path through which the measurement information is collected changes. Further, the intensities and directions along the 3 axes of the magnetometer may correspond to Mx, My, Mz, yaw, etc. which are the absolute orientation based on the magnetometer.

In this case, a dynamic location DB satisfying a preset dynamic condition may be extracted from the location DB based on the averages and standard deviations of respective pieces of measurement information corresponding to multiple pieces of measurement information.

The dynamic location DB is intended to efficiently perform computations that are required in order to estimate the location by reducing a search range within the terminal, and may be generated by extracting only a part that satisfies the preset dynamic condition from the location DB previously constructed by the collection terminal.

Here, the term "dynamic" means that information in the location DB corresponding to the terminal is variable depending on the time-varying condition of the terminal.

The location DB may include (Xgrid, Ygrid), ({RSSI_avg, RSSI_std}_AP_1, {RSSI_avg, RSSI_std}_AP_2, . . . , {RSSI_avg, RSSI_std}_AP_M), {RSSI_avg, RSSI_std}_BT_1, {RSSI_avg, RSSI_std}_BT_2, . . . , {RSSI_avg, RSSI_std}_BT_N), (Mag_norm_avg, Mag_norm_std), (Mag_heading_avg, Mag_heading_std), ({Path_heading_path_1}, . . . , {Path_heading_path_K}), and (Baro_avg, Baro_std).

Xgrid and Ygrid may denote a reference location. Here, the reference location is distinguished from a collection location, and may mean each reference point indicated in a discrete space or a continuous space so as to simplify spatial information, such as points sampled at regular intervals or grid points.

{RSSI_avg, RSSI_std}_AP_M may denote the average and standard deviation information of received signal strength indicator (RSSI) values corresponding to a Wi-Fi AP M. At this time, the average and standard deviation information of RSSI values may be repeatedly stored for all Wi-Fi APs from which signals are received.

{RSSI_avg, RSSI_std}_BT_N may denote the average and standard deviation information of RSSI values corresponding to a Bluetooth device N. At this time, the average and standard deviation information of RSSI values may be repeatedly stored for all Bluetooth devices from which signals are received.

Mag_norm_avg and Mag_norm_std may denote the average and standard deviation of norm values of the magnetometer. Here, the norm values of the magnetometer may be calculated, as given in the following Equation (3), and may correspond to scalar information that is not related to the posture of the terminal.

$$\text{Mag\_norm} = \sqrt{M_x^2 + M_y^2 + M_z^2} \qquad (3)$$

where $M_x$, $M_y$, and $M_z$ may correspond to the absolute orientation based on the magnetometer.

Further, Mag_heading_avg and Mag_heading_std may denote the average and standard deviation information of yaw values of the magnetometer and may correspond to a kind of azimuth angle.

{Path_heading}_path_K may denote the direction (heading) of a collection path K. This may mean all directions in which a pedestrian can move from the reference location in an indoor map along a link and may indicate a K-th direction in which the pedestrian can move.

Baro_avg and Baro_std may denote the average and standard deviation information of atmospheric pressure values.

In this case, averages and standard deviations for respective types of measurement information collected from respective reference locations of the location DB may mean values obtained by calculating averages and standard deviations from multiple pieces of measurement information received from the vicinity of respective reference locations.

For example, it may be assumed that reference location A of the location DB is present, and that pieces of measurement information corresponding to A1, A2, A3, A4, and A5, respectively, are collected from a range preset around reference location A. Here, averages and standard deviations for respective Wi-Fi APs corresponding to reference location A may correspond to values obtained by calculating averages and standard deviations of pieces of information for respective WI-Fi APs, which are measured to correspond to A1 to A5, respectively. Similarly, averages and standard deviations for respective Bluetooth devices corresponding to reference location A may correspond to values obtained by calculating averages and standard deviations for respective Bluetooth devices, which are measured to correspond to A1 to A5, respectively.

If all reference locations are identical to the locations at which measurement information was collected, a dynamic location DB may be immediately generated using the collected measurement information without needing to perform a task for extracting the dynamic location DB from the location DB.

In this regard, the preset dynamic condition may correspond to at least one of the case where at least one reference location included in the location DB falls within a reference range preset around the location of the terminal based on multiple pieces of measurement information and the case where the standard deviation of the locations of the terminal based on the multiple pieces of measurement information falls within a preset threshold range.

Here, since this means that the larger the standard deviation of the locations of the terminal based on multiple pieces of measurement information, the greater the range of change in the location of the terminal over time, it may be difficult to extract a dynamic location DB based on any one reference location of the location DB. Therefore, a threshold is preset based on the intervals between reference locations present in the location DB. When the standard deviation exceeds the preset threshold, a dynamic location DB may not be generated.

Further, when at least one reference location included in the location DB does not fall within the reference range preset around the location of the terminal based on the multiple pieces of measurement information, it is difficult to estimate the location of the terminal in the location DB, thus making it difficult to generate a dynamic location DB.

Therefore, the dynamic location DB may be generated when the preset dynamic condition is satisfied.

Here, the preset dynamic condition may be used by combining one or more conditions under the limited condition of a search range. For example, the preset dynamic conditions may be combined such that it is primarily determined whether the standard deviation of locations of the terminal based on the multiple pieces of measurement information falls within a preset threshold range, and such that, if it is determined that the standard deviation falls within the preset threshold range, it is secondarily determined whether at least one reference location included in the location DB falls within a reference range preset around the location of the terminal based on the multiple pieces of measurement information.

In this regard, multiple pieces of measurement information are corrected in accordance with the collection terminal corresponding to the location DB based on the measurement information correction DB for each terminal, thus enabling multiple pieces of corrected measurement information to be generated.

For example, the case where the measurement information chipset of a collection terminal for collecting in advance measurement information to construct a location DB is different from the measurement information chipset of the user terminal, which is used to estimate the location of the terminal, may be assumed. Here, even if the collection terminal and the user terminal receive measurement information at the same location, the received signal characteristics of the terminals are different from each other, and thus the two terminals may have different pieces of measurement information. These results may cause a problem in that a false probability value is calculated when likelihoods are calculated by comparing the measurement information in the dynamic location DB with the measurement information measured by the user terminal.

Therefore, the present invention may perform a correction procedure for performing correction such that the measurement information measured by the user terminal is similar to the information collected by the collection terminal using the measurement information correction DB for each terminal, which is separately stored.

Here, the measurement information correction DB for each terminal may include at least one of bias and a scale factor of received values for each of piece of measurement information measured at the same location in different types of terminals.

As an example of the procedure using the measurement information correction DB for each terminal, the model number of the user terminal is transmitted to a server hosting the measurement information correction DB for each terminal, and is then compared with the model number of the collection terminal. Thereafter, when the two models are found to be different from each other, a correction DB that enables the difference between the two models to be corrected is searched, and measurement information corresponding to the user terminal may be corrected with the bias and scale factor using the correction DB.

At this time, multiple individual likelihoods for pieces of corrected measurement information are combined with each other based on a preset combination formula, and a combined likelihood of the multiple pieces of measurement information may be calculated. That is, individual likelihoods are calculated for respective pieces of measurement information having different dimensions and are finally combined to calculate a combined likelihood corresponding to the multiple pieces of measurement information.

Here, the individual likelihoods may be calculated in such a way that first measurement information-based lists, acquired based on one reference location that is closest to the location corresponding to the motion model, are compared with second measurement information-based lists, acquired based on multiple pieces of corrected measurement information, and the individual likelihoods may be calculated using list information that matches between the first measurement information-based lists and the second measurement information-based lists.

A procedure for calculating multiple individual likelihoods is described below based on respective steps. First, the reference location closest to the current location of the terminal corresponding to the motion model is searched for in the dynamic location DB based on the current location of the terminal, and thus location DB values for respective pieces of measurement information may be obtained. For example, in the case of W-Fi APs, the averages and standard deviations of RSSI values for respective reception APs may be obtained in the form of $(\mu_{x_p,i}, \sigma_{x_p,i})$ and may be included in the first measurement information-based lists.

Thereafter, information is extracted for respective pieces of measurement information having different dimensions using multiple pieces of measurement information received from the user terminal. For example, in the case of Wi-Fi APs, when information for k Wi-Fi APs is received, the information may be defined to correspond to $W=\{w_1, w_2, \ldots, w_k\}$ and may be included in the second measurement information-based lists.

Then, the first measurement information-based lists corresponding to the location DB are compared with the second measurement information-based lists corresponding to the measurement information collected from the terminal, and only matching measurement information between the lists may be refined. For example, it may be assumed that m1 Wi-Fi AP lists are present in the location DB including a reference location approximate to the current location of the terminal corresponding to a motion model, and m2 Wi-Fi AP lists are present in measurement information collected from the user terminal. In this case, when the number of Wi-Fi AP lists that match each other between the m1 Wi-Fi AP lists and the m2 Wi-Fi AP lists is k, the likelihood of Wi-Fi APs may be calculated, as given in the following Equation (4):

$$W = \{w_1, w_2, \ldots, w_k\} \tag{4}$$

$$P(W \mid x_t) = P(\langle w_1, w_2, \ldots, w_k \rangle \mid x_t) = \left( \prod_{i=1}^{k} P(w_i \mid x_t) \right)^{1/k}$$

$$P(w_i \mid x_t) \propto \frac{1}{\sqrt{2\pi\sigma_{x_t,i}}} \exp\left( -\frac{(w_i - \mu_{x_t,i})^2}{2\sigma_{x_t,i}^2} \right)$$

In this case, there may be required an assumption that the RSSI values of multiple respective Wi-Fi APs in Equation (4) are independent of each other, and that the distribution of RSSI values conforms to a normal distribution.

In another example, in the case of Bluetooth, assuming that m lists match each other between the first measurement information-based lists and the second measurement information-based lists, the likelihood may be calculated as given in the following Equation (5):

$$B = \{b_1, b_2, \ldots, b_m\} \tag{5}$$

$$P(B \mid x_t) = P(\langle b_1, b_2, \ldots, b_m \rangle \mid x_t) = \left( \prod_{i=1}^{m} P(b_i \mid x_t) \right)^{1/m}$$

$$P(b_1 \mid x_t) \propto \frac{1}{\sqrt{2\pi\sigma_{x_t,i}}} \exp\left( -\frac{(b_i - \mu_{x_t,i})^2}{2\sigma_{x_t,i}^2} \right)$$

In a further embodiment, in the case of norm values of a magnetometer, the intensity and absolute values of magnetometer data (magnetic fields) are compared with the values in the dynamic location DB without considering the posture of the terminal. A likelihood indicating whether the distribution of the intensities of magnetometer data at the current location of the terminal corresponding to the motion model is similar to the distribution of the intensities of magnetometer data based on the measurement information measured by the terminal may be calculated, as given in the following Equation (6):

$$M_{norm} = \sqrt{M_x^2 + M_y^2 + M_z^2} \tag{6}$$

$$P(M_{norm} \mid x_t) \propto \frac{1}{\sqrt{2\pi\sigma_{x_t,mag}}} \exp\left( -\frac{(M_{mag} - \mu_{x_t,mag})^2}{2\sigma_{x_t,mag}^2} \right)$$

In yet another example, in the case of yaw of the magnetometer, a likelihood indicating whether the yaw measurement direction of the terminal corresponding to the motion model at the current location is similar to a measurement direction based on the measurement information measured by the terminal may be calculated, as given in the following Equation (7):

$$M_{yaw} = \theta_{yaw} \tag{7}$$

$$P(M_{yaw} \mid x_t) \propto \frac{1}{\sqrt{2\pi\sigma_{x_t,yaw}}} \exp\left( -\frac{(M_{yaw} - \mu_{x_t,yaw})^2}{2\sigma_{x_t,yaw}^2} \right)$$

In the case of a pedestrian, a likelihood may be calculated on the assumption that, when the pedestrian is moving, he or she moves in a direction that follows the direction of a path in most cases. In particular, a direction-related likelihood function is used near an intersection, such as a three-way intersection or four-way intersection, and thus a high weight may be assigned to the sample of the motion model present in the current movement path.

Therefore, assuming that a total of M individual likelihoods are calculated depending on the types of measurement information, the combined likelihood corresponding to multiple pieces of measurement information may be finally calculated by combining the M individual likelihoods with each other in conformity with the following Equation (8):

$$P(W,B,M_{norm},M_{yaw} \mid x_t) = (P(W \mid x_t) \cdot P(B \mid x_t) \cdot P(M_{norm} \mid x_t) \cdot P(M_{yaw} \mid x_t))^{1/4} \tag{8}$$

In this case, in Equation (8), it may be assumed that the number of types of measurement information is 4, in other words, four individual likelihoods are combined and individual pieces of measurement information are independently received.

The type and number of pieces of measurement information according to the present invention may not be especially limited. Further, all pieces of independent measurement information that may be received from the user terminal are combined in a form corresponding to Equation (8), and the value of a probability that the measurement information will be present at the location on the motion model may be calculated as a nondimensionalized probability density.

The location estimation unit 240 estimates the location and direction (heading) of the terminal by applying weights to at least one sample value corresponding to the motion model. For example, new particles to be included in a particle set corresponding to the sample of the motion model may be calculated depending on the probabilities proportional to the weights. Thereafter, the location and direction of the terminal may be calculated using the averages of the locations and directions of the new particles.

Here, the weights for at least one sample value corresponding to the motion model may be calculated in proportion to the combined likelihood, that is, the likelihood corresponding to multiple pieces of measurement information, and the weights may be normalized such that the sum of the weights is 1.

At this time, information about the finally estimated location and direction of the terminal may be transferred to the location DB and may be used to update the location DB. Further, such information may be transferred to a module for generating the motion model and may be used as base information to subsequently generate a motion model required for the estimation of the location of the terminal.

As described above, the storage unit 250 stores various types of information that are generated in a location estimation process according to an embodiment of the present invention.

According to an embodiment, the storage unit 250 may be configured independently of the location estimation apparatus 110 and may support a function required for the estimation of the location of the terminal. Here, the storage unit 250 may be operated as a separate large-capacity storage device and may include a control function for performing operations.

Meanwhile, the location estimation apparatus 110 using a combination of different positioning resources may be equipped with memory and may store information therein. In an exemplary embodiment, the memory is a computer-readable medium. In an exemplary embodiment, the memory may be a volatile memory unit, and in another exemplary embodiment, the memory may be a nonvolatile memory unit. In an exemplary embodiment, the storage device is a computer-readable medium. In various different exemplary embodiments, the storage device may include, for example, a hard disk device, an optical disk device or other large-capacity storage devices.

By utilizing the location estimation apparatus 110, the location of the terminal may be estimated by efficiently combining positioning resources having different dimensions in a positioning algorithm.

Further, the present invention may shorten the time required to estimate the location of a terminal by limitedly calculating a dynamic DB corresponding to a current terminal from an existing location DB based on predetermined criteria.

Furthermore, the present invention may more precisely estimate the location of a user terminal by reducing an error corresponding to the difference between a measurement information collection terminal and the user terminal.

Figure 3:
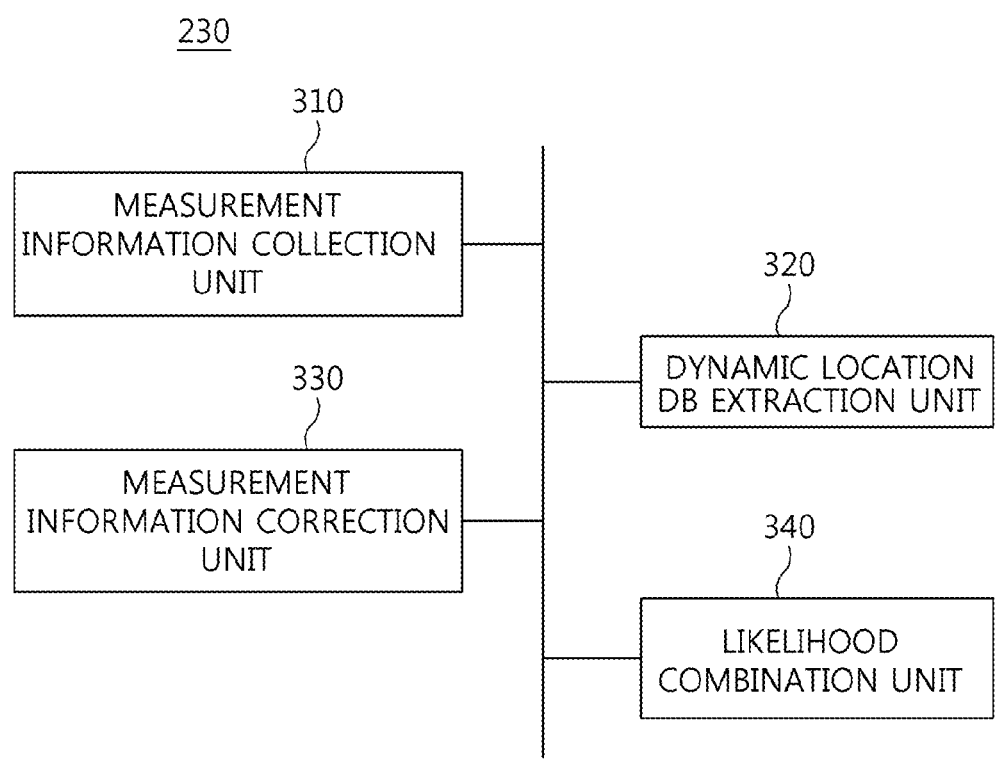
FIG. 3 is a block diagram showing an example of the weight calculation unit shown in FIG. 2.

FIG. 3 is a block diagram showing an example of the weight calculation unit shown in FIG. 2.

Referring to FIG. 3, the weight calculation unit 230 shown in FIG. 2 includes a measurement information collection unit 310, a dynamic location DB extraction unit 320, a measurement information correction unit 330, and a likelihood combination unit 340.

The measurement information collection unit 310 stores collection locations at which the multiple pieces of measurement information are collected in synchronization with at least one of wireless communication infrastructure information and sensor information, which are included in the multiple pieces of measurement information.

For example, the multiple pieces of measurement information may include collection locations, Media Access Control (MAC) information and Received Signal Strength Indicator (RSSI) information for each Wi-Fi AP, collection directions, the relative locations of start and end points of collection, intensities and directions along 3 axes of a magnetometer, the atmospheric pressure of a barometer, etc.

Here, the collection directions may be an absolute orientation based on a collection path. Therefore, the collection direction may be collected once whenever the direction of the collection path through which the measurement information is collected changes. Further, the intensities and directions along the 3 axes of the magnetometer may correspond to Mx, My, Mz, yaw, etc. which are the absolute orientation based on the magnetometer.

The dynamic location DB extraction unit 320 extracts a dynamic location DB satisfying a preset dynamic condition from the location DB based on the averages and standard deviations of respective pieces of measurement information corresponding to multiple pieces of measurement information.

The dynamic location DB is intended to efficiently perform computations that are required in order to estimate the location by reducing a search range within the terminal, and may be generated by extracting only a part that satisfies the preset dynamic condition from the location DB previously constructed by the collection terminal.

Here, the term "dynamic" means that information in the location DB corresponding to the terminal is variable depending on the time-varying condition of the terminal.

In this case, averages and standard deviations for respective types of measurement information collected from respective reference locations of the location DB may mean values obtained by calculating averages and standard deviations from multiple pieces of measurement information received from the vicinity of respective reference locations.

For example, it may be assumed that reference location A of the location DB is present, and that pieces of measurement information corresponding to A1, A2, A3, A4, and A5, respectively, are collected from a range preset around reference location A. Here, averages and standard deviations for respective Wi-Fi APs corresponding to reference location A may correspond to values obtained by calculating averages and standard deviations of pieces of information for respective WI-Fi APs, which are measured to correspond to A1 to A5, respectively. Similarly, averages and standard deviations for respective Bluetooth devices corresponding to reference location A may correspond to values obtained by calculating averages and standard deviations for respective Bluetooth devices, which are measured to correspond to A1 to A5, respectively.

If all reference locations are identical to the locations at which measurement information was collected, a dynamic location DB may be immediately generated using the collected measurement information without needing to perform a task for extracting the dynamic location DB from the location DB.

In this regard, the preset dynamic condition may correspond to at least one of the case where at least one reference location included in the location DB falls within a reference range preset around the location of the terminal based on multiple pieces of measurement information and the case where the standard deviation of the locations of the terminal based on the multiple pieces of measurement information falls within a preset threshold range.

Here, since this means that the larger the standard deviation of the locations of the terminal based on multiple pieces of measurement information, the greater the range of change in the location of the terminal over time, it may be difficult to extract a dynamic location DB based on any one reference location of the location DB. Therefore, a threshold is preset based on the intervals between reference locations present in the location DB. When the standard deviation exceeds the preset threshold, a dynamic location DB may not be generated.

Further, when at least one reference location included in the location DB does not fall within the reference range preset around the location of the terminal based on the multiple pieces of measurement information, it is difficult to estimate the location of the terminal in the location DB, thus making it difficult to generate a dynamic location DB.

Therefore, the dynamic location DB may be generated when the preset dynamic condition is satisfied.

Here, the preset dynamic condition may be used by combining one or more conditions under the limited condition of a search range. For example, the preset dynamic conditions may be combined such that it is primarily determined whether the standard deviation of locations of the terminal based on the multiple pieces of measurement information falls within a preset threshold range, and such that, if it is determined that the standard deviation falls within the preset threshold range, it is secondarily determined whether at least one reference location included in the location DB falls within a reference range preset around the location of the terminal based on the multiple pieces of measurement information.

The measurement information correction unit 330 corrects multiple pieces of measurement information in accordance with the collection terminal corresponding to the location DB based on the measurement information correction DB for each terminal, and then generates multiple pieces of corrected measurement information.

For example, the case where the measurement information chipset of a collection terminal for collecting in advance measurement information to construct a location DB is different from the measurement information chipset of the user terminal, which is used to estimate the location of the terminal, may be assumed. Here, even if the collection terminal and the user terminal receive measurement information at the same location, the received signal characteristics of the terminals are different from each other, and thus the two terminals may have different pieces of measurement information. These results may cause a problem in that a false probability value is calculated when likelihoods are calculated by comparing the measurement information in the dynamic location DB with the measurement information measured by the user terminal.

Therefore, the present invention may perform a correction procedure for performing correction such that the measurement information measured by the user terminal is similar to the information collected by the collection terminal using the measurement information correction DB for each terminal, which is separately stored.

Here, the measurement information correction DB for each terminal may include at least one of bias and a scale factor of received values for each of piece of measurement information measured at the same location in different types of terminals.

As an example of the procedure using the measurement information correction DB for each terminal, the model number of the user terminal is transmitted to a server hosting the measurement information correction DB for each terminal, and is then compared with the model number of the collection terminal. Thereafter, when the two models are found to be different from each other, a correction DB that enables the difference between the two models to be corrected is searched, and measurement information corresponding to the user terminal may be corrected with the bias and scale factor using the correction DB.

The likelihood combination unit 340 combines multiple individual likelihoods for pieces of corrected measurement information with each other based on a preset combination formula, and then calculates a combined likelihood of the multiple pieces of measurement information.

Here, the individual likelihoods may be calculated in such a way that first measurement information-based lists, acquired based on one reference location that is closest to the location corresponding to the motion model, are compared with second measurement information-based lists, acquired based on multiple pieces of corrected measurement information, and the individual likelihoods may be calculated using list information that matches between the first measurement information-based lists and the second measurement information-based lists.

A procedure for calculating multiple individual likelihoods is described below based on respective steps. First, the reference location closest to the current location of the terminal corresponding to the motion model is searched for in the dynamic location DB based on the current location of the terminal, and thus location DB values for respective pieces of measurement information may be obtained. For example, in the case of W-Fi APs, the averages and standard deviations of RSSI values for respective reception APs may be obtained in the form of $(\mu_{x_r,i}, \sigma_{x_r,i})$ and may be included in the first measurement information-based lists.

Thereafter, information is extracted for respective pieces of measurement information having different dimensions using multiple pieces of measurement information received from the user terminal. For example, in the case of Wi-Fi APs, when information for k Wi-Fi APs is received, the information may be defined to correspond to $W=\{w_1, w_2, \ldots, w_k\}$ and may be included in the second measurement information-based lists.

Then, the first measurement information-based lists corresponding to the location DB are compared with the second measurement information-based lists corresponding to measurement information collected from the terminal, and only matching information between the lists may be refined and may be used to calculate the likelihood corresponding to multiple pieces of measurement information.

Figure 4:
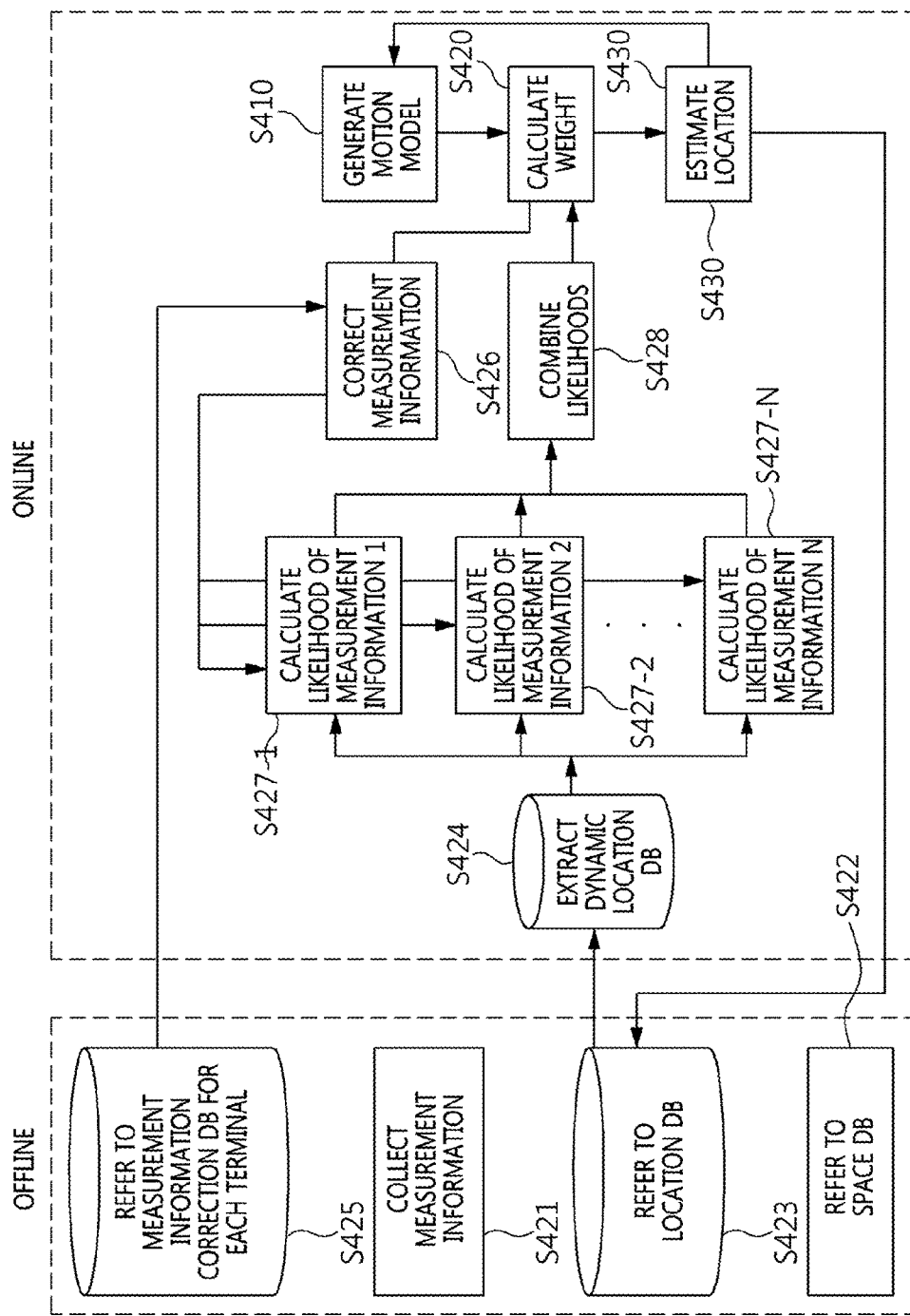
FIG. 4 is a diagram showing a location estimation procedure using a combination of different positioning resources according to an embodiment of the present invention.

FIG. 4 is a diagram showing a location estimation process using a combination of different positioning resources according to an embodiment of the present invention.

Referring to FIG. 4, the location estimation process using a combination of different positioning resources according to the embodiment of the present invention may first generate a motion model corresponding to the state variable of the terminal through the motion model generation unit included in the location estimation apparatus at step S410. Here, the motion model may be generated based on at least one of a probability-based motion model and a sensor-based motion model.

Thereafter, weights for at least one sample corresponding to the motion model may be calculated at step S420. In order to calculate the weights, the location DB may be referred to at step S423, and a dynamic location DB corresponding to multiple pieces of measurement information acquired from the user terminal may be extracted at step S424.

In this case, the location DB may collect measurement information in advance using a collection terminal at step S421 and may be constructed with reference to an existing space DB at step S422.

Then, individual likelihoods may be calculated for respective pieces of measurement information corresponding to multiple pieces of measurement information collected from the user terminal based on the dynamic location DB at steps S427-1 to S427-N.

Here, since a measurement information chipset corresponding to the user terminal may be different from a measurement information chipset corresponding to the collection terminal, the measurement information correction DB for each terminal may be referred to at step S425 and the multiple pieces of measurement information collected from the terminal may be corrected at step S426.

That is, the individual likelihoods may be calculated using the results of correction performed such that multiple pieces of measurement information are identical to pieces of measurement information collected through the collection terminal.

Thereafter, the multiple individual likelihoods are combined with each other at step S428, and then weights proportional to the combined likelihood of multiple pieces of measurement information may be calculated at step S420.

Then, the location and direction of the user terminal may be estimated by applying the weights to at least one sample corresponding to the motion model at step S430.

In this case, the information corresponding to the finally estimated location and direction of the terminal may be transferred to the location DB and to the motion model generation unit, and may then be used as base information required to subsequently estimate the location of the terminal.

Figure 5:
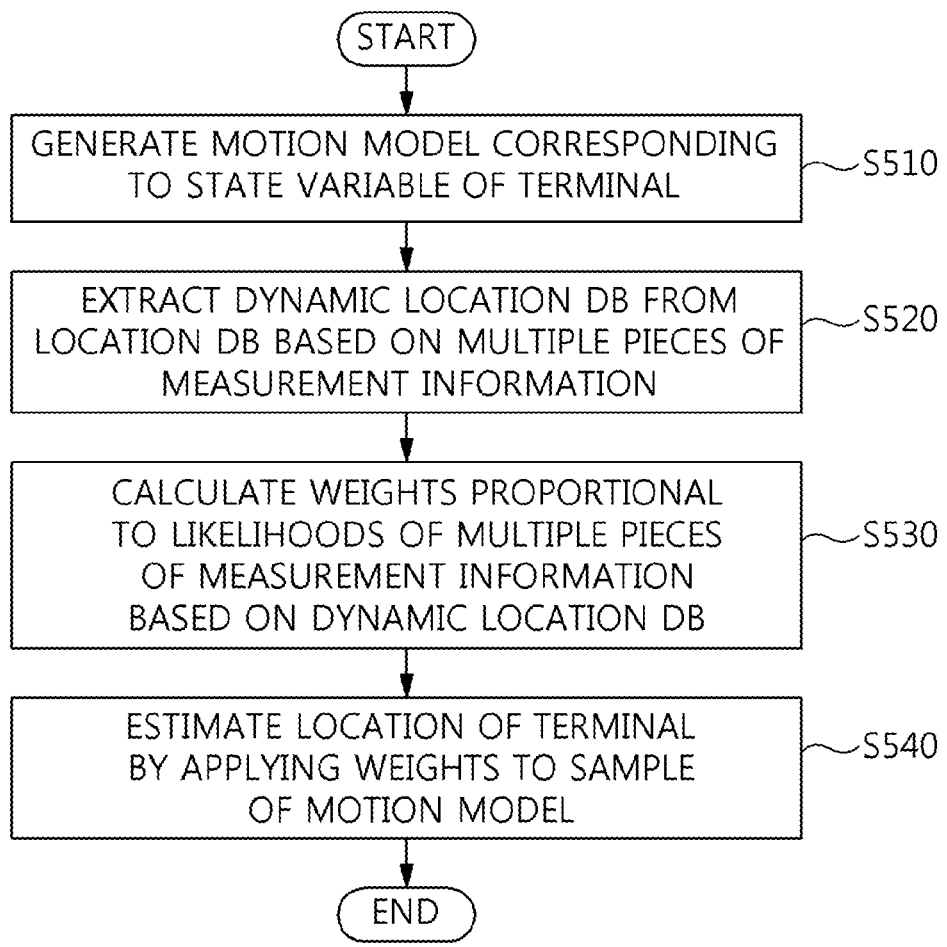
FIG. 5 is an operation flowchart showing a location estimation method using a combination of different positioning resources according to an embodiment of the present invention.

FIG. 5 is an operation flowchart showing a location estimation method using a combination of different positioning resources according to an embodiment of the present invention.

Referring to FIG. 5, the location estimation method using a combination of different positioning resources according to the embodiment of the present invention generates a mobile model corresponding to the state variable of the terminal based on the current time at step S510.

In this regard, the motion model may be a movement model corresponding to the state variable of the terminal during a period from a time previous to the current time to the current time. For example, assuming that the current time is t, the motion model may be a movement model corresponding to the location and direction of the terminal during a period from time t−1, which is a previous time, to the current time t.

Here, the motion model may be generated based on at least one of a probability-based motion model and a sensor-based motion model.

The probability-based motion model may be a model obtained by individually defining the state transition probabilities of the terminal via statistical modeling. For example, assuming that the current time is t, the motion model may be obtained by defining the motional state, positional state, or directional state of the terminal from the previous time t−1 to the current time t via statistical modeling.

Therefore, the probability-based motion model is advantageous in that it may be implemented easily even if the precision of the model may be deteriorated because measurement information related to the actual movement of a pedestrian is not observed.

Meanwhile, the sensor-based motion model may be a model obtained by relatively accurately predicting the motion of a motion model in a short period of time by means of Pedestrian Dead Reckoning (PDR) technology, which uses actual measurement sensor information when a sudden change of direction occurs, as in the case of a pedestrian, or when a great change in motion state appears for a certain entity. Here, the actual measurement sensor information may be sensor information measured using a sensor such as an accelerometer, a gyroscope, or a magnetometer.

Here, the mobility terminal according to the present invention may use any type of method capable of describing the mobility characteristics of the terminal without being limited to a specific method.

In this case, a typical mathematical model for generating a motion model according to an embodiment of the present invention is given in the following Equation (1):

$$P(x_t|x_{t-1},u_t) \tag{1}$$

where $x_t$ may denote the location and direction information at the current time t, and $u_t$ may denote motion information corresponding to the current time t.

Further, the location estimation method using a combination of different positioning resources according to the embodiment of the present invention extracts a dynamic location DB from the location DB based on multiple pieces of measurement information received from the terminal at step S520.

Here, the multiple pieces of measurement information may include at least one of one or more pieces of wireless communication infrastructure information and sensor information that may be received from the terminal.

In this way, a typical mathematical model indicating multiple pieces of measurement information according to the present invention may correspond to Equation (2):

$$P(z_t|x_t^m) \tag{2}$$

where $z_t$ may denote measurement information at the current time t. That is, the measurement information may mean all available information that can be received from the terminal of the user and that can be used to estimate the state variable of the terminal, and there may be multiple pieces of measurement information for each type of measurement information.

Here, collection locations at which the multiple pieces of measurement information are collected may be stored in synchronization with at least one of wireless communication infrastructure information and sensor information, which are included in the multiple pieces of measurement information.

For example, the multiple pieces of measurement information may include collection locations, Media Access Control (MAC) information and Received Signal Strength Indicator (RSSI) information for each Wi-Fi AP, collection directions, the relative locations of start and end points of collection, intensities and directions along 3 axes of a magnetometer, the atmospheric pressure of a barometer, etc.

Here, the collection directions may be an absolute orientation based on a collection path. Therefore, the collection direction may be collected once whenever the direction of the collection path through which the measurement information is collected changes. Further, the intensities and directions along the 3 axes of the magnetometer may correspond to Mx, My, Mz, yaw, etc. which are the absolute orientation based on the magnetometer.

In this case, a dynamic location DB satisfying a preset dynamic condition may be extracted from the location DB based on the averages and standard deviations of respective pieces of measurement information corresponding to multiple pieces of measurement information.

The dynamic location DB is intended to efficiently perform computations that are required in order to estimate the location by reducing a search range within the terminal, and may be generated by extracting only a part that satisfies the preset dynamic condition from the location DB previously constructed by the collection terminal.

Here, the term "dynamic" means that information in the location DB corresponding to the terminal is variable depending on the time-varying condition of the terminal.

The location DB may include (Xgrid, Ygrid), ({RSSI_avg, RSSI_std}_AP_1, {RSSI_avg, RSSI_std}_AP_2, {RSSI_avg, RSSI_std}_AP_M), ({RSSI_avg, RSSI_std}_BT_1, {RSSI_avg, RSSI_std}_BT_2, {RSSI_avg, RSSI_std}_BT_N), (Mag_norm_avg, Mag_norm_std), (Mag_heading_avg, Mag_heading_std), ({Path_heading_path_1}, {Path_heading_path_K}), and (Baro_avg, Baro_std).

Xgrid and Ygrid may denote a reference location. Here, the reference location is distinguished from a collection location, and may mean each reference point indicated in a discrete space or a continuous space so as to simplify spatial information, such as points sampled at regular intervals or grid points.

{RSSI_avg, RSSI_std}_AP_M may denote the average and standard deviation information of received signal strength indicator (RSSI) values corresponding to a Wi-Fi AP M. At this time, the average and standard deviation information of RSSI values may be repeatedly stored for all Wi-Fi APs from which signals are received.

{RSSI_avg, RSSI_std}_BT_N may denote the average and standard deviation information of RSSI values corresponding to a Bluetooth device N. At this time, the average and standard deviation information of RSSI values may be repeatedly stored for all Bluetooth devices from which signals are received.

Mag_norm_avg and Mag_norm_std may denote the average and standard deviation of norm values of the magnetometer. Here, the norm values of the magnetometer may be calculated, as given in the following Equation (3), and may correspond to scalar information that is not related to the posture of the terminal.

$$\text{Mag\_norm} = \sqrt{M_x^2 + M_y^2 + M_z^2} \quad (3)$$

where $M_x$, $M_y$, and $M_z$ may correspond to the absolute orientation based on the magnetometer.

Further, Mag_heading_avg and Mag_heading_std may denote the average and standard deviation information of yaw values of the magnetometer and may correspond to a kind of azimuth angle.

{Path_heading}_path_K may denote the direction (heading) of a collection path K. This may mean all directions in which a pedestrian can move from the reference location in an indoor map along a link and may indicate a K-th direction in which the pedestrian can move.

Baro_avg and Baro_std may denote the average and standard deviation information of atmospheric pressure values.

In this case, averages and standard deviations of respective types of measurement information collected from respective reference locations of the location DB may mean values obtained by calculating averages and standard deviations from multiple pieces of measurement information received from the vicinity of respective reference locations.

For example, it may be assumed that reference location A of the location DB is present, and that pieces of measurement information corresponding to A1, A2, A3, A4, and A5, respectively, are collected from a range preset around reference location A. Here, averages and standard deviations for respective Wi-Fi APs corresponding to reference location A may correspond to values obtained by calculating averages and standard deviations of pieces of information for respective WI-Fi APs, which are measured to correspond to A1 to A5, respectively. Similarly, averages and standard deviations for respective Bluetooth devices corresponding to reference location A may correspond to values obtained by calculating averages and standard deviations for respective Bluetooth devices, which are measured to correspond to A1 to A5, respectively.

If all reference locations are identical to the locations at which measurement information was collected, a dynamic location DB may be immediately generated using the collected measurement information without needing to perform a task for extracting the dynamic location DB from the location DB.

In this regard, the preset dynamic condition may correspond to at least one of the case where at least one reference location included in the location DB falls within a reference range preset around the location of the terminal based on multiple pieces of measurement information and the case where the standard deviation of the locations of the terminal based on the multiple pieces of measurement information falls within a preset threshold range.

Here, since this means that the larger the standard deviation of the locations of the terminal based on multiple pieces of measurement information, the greater the range of change in the location of the terminal over time, it may be difficult to extract a dynamic location DB based on any one reference location of the location DB. Therefore, a threshold is preset based on the intervals between reference locations present in the location DB. When the standard deviation exceeds the preset threshold, a dynamic location DB may not be generated.

Further, when at least one reference location included in the location DB does not fall within the reference range preset around the location of the terminal based on the multiple pieces of measurement information, it is difficult to estimate the location of the terminal in the location DB, thus making it difficult to generate a dynamic location DB.

Therefore, the dynamic location DB may be generated when the preset dynamic condition is satisfied.

Here, the preset dynamic condition may be used by combining one or more conditions under the limited condition of a search range. For example, the preset dynamic conditions may be combined such that it is primarily determined whether the standard deviation of locations of the terminal based on the multiple pieces of measurement information falls within a preset threshold range, and such that, if it is determined that the standard deviation falls within the preset threshold range, it is secondarily determined whether at least one reference location included in the location DB falls within a reference range preset around the location of the terminal based on the multiple pieces of measurement information.

Further, the location estimation method using a combination of different positioning resources according to the embodiment of the present invention calculates weights proportional to likelihoods of multiple pieces of measurement information based on the dynamic location DB at step S530. That is, the probabilities that multiple pieces of measurement information received from the terminal will be present at the current time may be calculated from the state variable of the terminal corresponding to the current time, and weights may be calculated in proportion to the probabilities.

In this regard, multiple pieces of measurement information are corrected in accordance with the collection terminal corresponding to the location DB based on the measurement information correction DB for each terminal, thus enabling multiple pieces of corrected measurement information to be generated.

For example, the case where the measurement information chipset of a collection terminal for collecting in advance measurement information to construct a location DB is different from the measurement information chipset of the user terminal, which is used to estimate the location of the terminal, may be assumed. Here, even if the collection terminal and the user terminal receive measurement information at the same location, the received signal characteristics of the terminals are different from each other, and thus the two terminals may have different pieces of measurement information. These results may cause a problem in that a false probability value is calculated when likelihoods are calculated by comparing the measurement information in the dynamic location DB with the measurement information measured by the user terminal.

Therefore, the present invention may perform a correction procedure for performing correction such that the measurement information measured by the user terminal is similar to the information collected by the collection terminal using the measurement information correction DB for each terminal, which is separately stored.

Here, the measurement information correction DB for each terminal may include at least one of bias and a scale factor of received values for each of piece of measurement information measured at the same location in different types of terminals.

As an example of the procedure using the measurement information correction DB for each terminal, the model number of the user terminal is transmitted to a server hosting the measurement information correction DB for each terminal, and is then compared with the model number of the collection terminal. Thereafter, when the two models are found to be different from each other, a correction DB that enables the difference between the two models to be corrected is searched, and measurement information corresponding to the user terminal may be corrected with the bias and scale factor using the correction DB.

At this time, multiple individual likelihoods for pieces of corrected measurement information are combined with each other based on a preset combination formula, and a combined likelihood of the multiple pieces of measurement information may be calculated. That is, individual likelihoods are calculated for respective pieces of measurement information having different dimensions and are finally combined to calculate a combined likelihood corresponding to the multiple pieces of measurement information.

Here, the individual likelihoods may be calculated in such a way that first measurement information-based lists, acquired based on one reference location that is closest to the location corresponding to the motion model, are compared with second measurement information-based lists, acquired based on multiple pieces of corrected measurement information, and the individual likelihoods may be calculated using list information that matches between the first measurement information-based lists and the second measurement information-based lists.

A procedure for calculating multiple individual likelihoods is described below based on respective steps. First, the reference location closest to the current location of the terminal corresponding to the motion model is searched for in the dynamic location DB based on the current location of the terminal, and thus location DB values for respective pieces of measurement information may be obtained. For example, in the case of W-Fi APs, the averages and standard deviations of RSSI values for respective reception APs may be obtained in the form of $(\mu_{x_t,i}, \sigma_{x_t,i})$ and may be included in the first measurement information-based lists.

Thereafter, information is extracted for respective pieces of measurement information having different dimensions using multiple pieces of measurement information received from the user terminal. For example, in the case of Wi-Fi APs, when information for k Wi-Fi APs is received, the information may be defined to correspond to $W=\{w_1, w_2, \ldots, w_k\}$ and may be included in the second measurement information-based lists.

Then, the first measurement information-based lists corresponding to the location DB are compared with the second measurement information-based lists corresponding to the measurement information collected from the terminal, and only matching measurement information between the lists may be refined. For example, it may be assumed that m1 Wi-Fi AP lists are present in the location DB including a reference location approximate to the current location of the terminal corresponding to a motion model, and m2 Wi-Fi AP lists are present in measurement information collected from the user terminal. In this case, when the number of Wi-Fi AP lists that match each other between the m1 Wi-Fi AP lists and the m2 Wi-Fi AP lists is k, the likelihood of Wi-Fi APs may be calculated, as given in the following Equation (4):

$$W = \{w_1, w_2, \ldots, w_k\} \tag{4}$$

$$P(W \mid x_t) = P(\langle w_1, w_2, \ldots, w_k \rangle \mid x_t) = \left(\prod_{i=1}^{k} P(w_i \mid x_t)\right)^{1/k}$$

$$P(w_i \mid x_t) \propto \frac{1}{\sqrt{2\pi\sigma_{x_t,i}}} \exp\left(-\frac{(w_i - \mu_{x_t,i})^2}{2\sigma_{x_t,i}^2}\right)$$

In this case, there may be required an assumption that the RSSI values of multiple respective Wi-Fi APs in Equation (4) are independent of each other, and that the distribution of RSSI values conforms to a normal distribution.

In another example, in the case of Bluetooth, assuming that m lists match each other between the first measurement information-based lists and the second measurement information-based lists, the likelihood may be calculated as given in the following Equation (5):

$$B = \{b_1, b_2, \ldots, b_m\} \tag{5}$$

$$P(B \mid x_t) = P(\langle b_1, b_2, \ldots, b_m \rangle \mid x_t) = \left(\prod_{i=1}^{m} P(b_i \mid x_t)\right)^{1/m}$$

$$P(b_i \mid x_t) \propto \frac{1}{\sqrt{2\pi\sigma_{x_t,i}}} \exp\left(-\frac{(b_i - \mu_{x_t,i})^2}{2\sigma_{x_t,i}^2}\right)$$

In a further embodiment, in the case of norm values of a magnetometer, the intensity and absolute values of magnetometer data (magnetic fields) are compared with the values in the dynamic location DB without considering the posture of the terminal. A likelihood indicating whether the distribution of the intensities of magnetometer data at the current location of the terminal corresponding to the motion model is similar to the distribution of the intensities of magnetometer data based on the measurement information measured by the terminal may be calculated, as given in the following Equation (6):

$$M_{norm} = \sqrt{M_x^2 + M_y^2 + M_z^2} \tag{6}$$

$$P(M_{norm} \mid x_t) \propto \frac{1}{\sqrt{2\pi\sigma_{x_t,mag}}} \exp\left(-\frac{(M_{mag} - \mu_{x_t,mag})^2}{2\sigma_{x_t,mag}^2}\right)$$

In yet another example, in the case of yaw of the magnetometer, a likelihood indicating whether the yaw measurement direction of the terminal corresponding to the motion model at the current location is similar to a measurement direction based on the measurement information measured by the terminal may be calculated, as given in the following Equation (7):

$$M_{yaw} = \theta_{yaw} \tag{7}$$

$$P(M_{yaw} | x_t) \propto \frac{1}{\sqrt{2\pi\sigma_{x_t,yaw}}} \exp\left(-\frac{(M_{yaw} - \mu_{x_t,yaw})^2}{2\sigma^2_{x_t,yaw}}\right)$$

In the case of a pedestrian, a likelihood may be calculated on the assumption that, when the pedestrian is moving, he or she moves in a direction that follows the direction of a path in most cases. In particular, a direction-related likelihood function is used near an intersection, such as a three-way intersection or four-way intersection, and thus a high weight may be assigned to the sample of the motion model present in the current movement path.

Therefore, assuming that a total of M individual likelihoods are calculated depending on the types of measurement information, the combined likelihood corresponding to multiple pieces of measurement information may be finally calculated by combining the M individual likelihoods with each other in conformity with the following Equation (8):

$$P(W,B,M_{norm},M_{yaw}|x_t) = (P(W|x_t) \cdot P(B|x_t) \cdot P(M_{norm}|x_t) \cdot P(M_{yaw}|x_t))^{1/4} \tag{8}$$

In this case, in Equation (8), it may be assumed that the number of types of measurement information is 4, in other words, four individual likelihoods are combined and individual pieces of measurement information are independently received.

The type and number of pieces of measurement information according to the present invention may not be especially limited. Further, all pieces of independent measurement information that may be received from the user terminal are combined in a form corresponding to Equation (8), and the value of a probability that the measurement information will be present at the location on the motion model may be calculated as a nondimensionalized probability density.

Further, the location estimation method using a combination of different positioning resources according to the embodiment of the present invention estimates the location and direction of the terminal by applying the weights to at least one sample value corresponding to the motion model at step S540. For example, new particles to be included in a particle set corresponding to the sample of the motion model may be calculated depending on the probabilities proportional to the weights. Thereafter, the location and direction of the terminal may be calculated using the averages of the locations and directions of the new particles.

Here, the weights for at least one sample value corresponding to the motion model may be calculated in proportion to the combined likelihood, that is, the likelihood corresponding to multiple pieces of measurement information, and the weights may be normalized such that the sum of the weights is 1.

At this time, information about the finally estimated location and direction of the terminal may be transferred to the location DB and may be used to update the location DB. Further, such information may be transferred to a module for generating the motion model and may be used as base information to subsequently generate a motion model required for the estimation of the location of the terminal.

Furthermore, although not shown in FIG. 5, the location estimation method using a combination of different positioning resources according to the embodiment of the present invention transmits and receives data required to estimate the location of the terminal. In particular, multiple pieces of measurement information may be received from at least one terminal, and information obtained by estimating the location of the terminal may be provided to the location DB.

Here, the data may be transmitted and received over the network.

The network is intended to provide a path through which data is transferred between the user terminal and the location estimation apparatus 110, and is a concept including all existing networks that have been conventionally used and networks that may be developed in the future. For example, the network may be any one of a wired/wireless location area network (LAN) for providing communication between various types of information devices in a limited area, a mobile communication network for providing communication between moving objects and between a moving object and the outside of the moving object, a satellite communication network for providing communication between individual earth stations using satellites, and a wired/wireless communication network, or a combination of two or more thereof. Meanwhile, transfer mode standards of the network are not limited to existing transfer mode standards, but may include all transfer mode standards to be developed in the future.

Further, although not shown in FIG. 5, the location estimation method using a combination of different positioning resources according to the embodiment of the present invention stores various types of information that are generated in the location estimation process according to the embodiment of the present invention.

According to an embodiment, a storage module for storing information may be configured independently of the location estimation apparatus and may support a function for estimating the location of the terminal. Here, the storage module may act as a separate large-capacity storage device and may include a control function for performing operations.

By means of this location estimation method, the location of a terminal may be estimated by efficiently combining positioning resources having different dimensions with each other in a positioning algorithm.

Further, the present invention may shorten the time required to estimate the location of a terminal by limitedly calculating a dynamic DB corresponding to a current terminal from an existing location DB based on predetermined criteria.

Furthermore, the present invention may more precisely estimate the location of a user terminal by reducing an error corresponding to the difference between a measurement information collection terminal and the user terminal.

Figure 6:
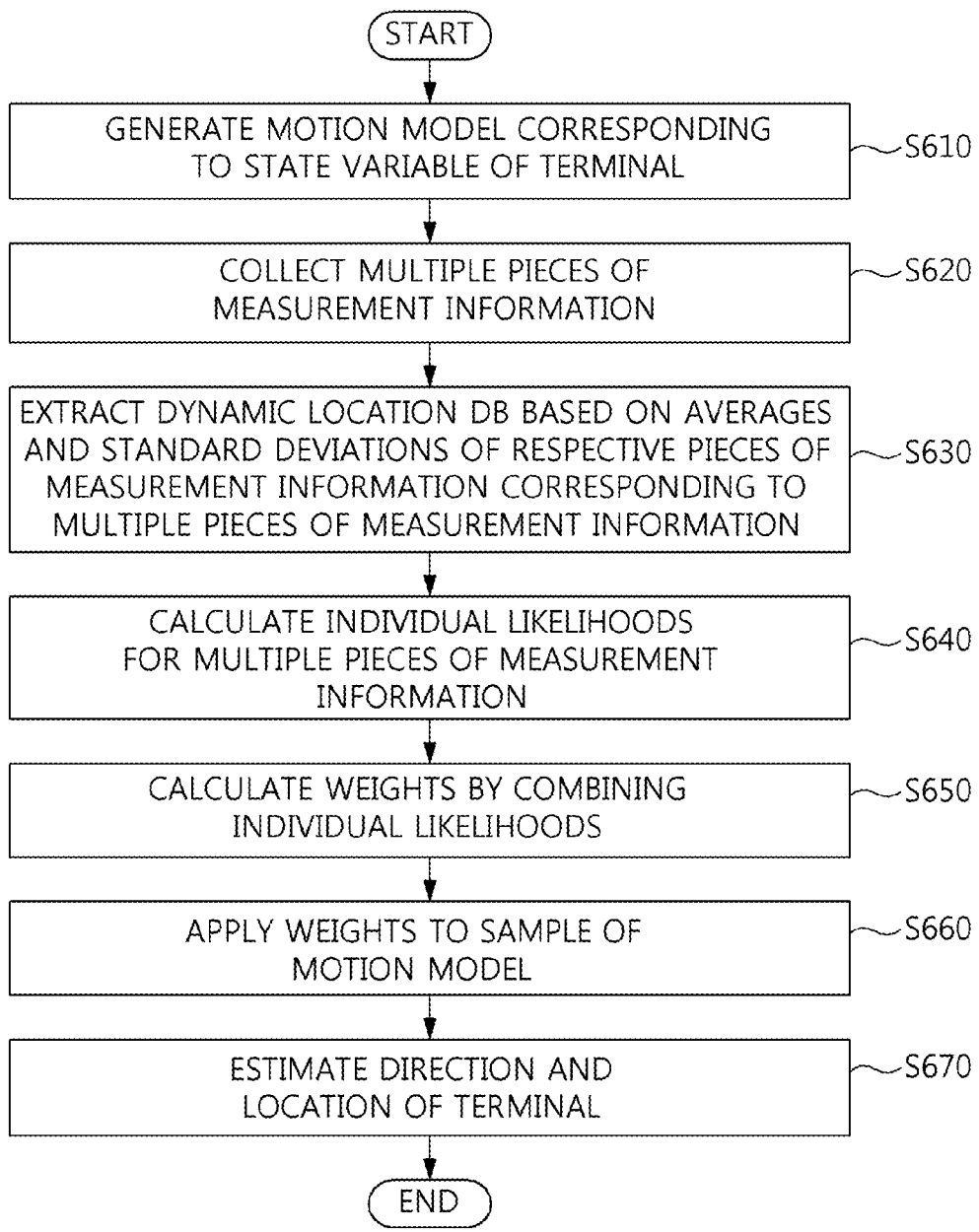
FIG. 6 is an operation flowchart showing in detail a position estimation method using a combination of different positioning resources according to an embodiment of the present invention.

FIG. 6 is an operation flowchart showing in detail the location estimation method using a combination of different positioning resources according to an embodiment of the present invention.

Referring to FIG. 6, the location estimation method using a combination of different positioning resources according to the embodiment of the present invention generates a motion model corresponding to the state variable of the terminal based on the current time at step S610.

In this regard, the motion model may correspond to a movement model corresponding to the state variable of the terminal during a period from a time previous to the current time to the current time.

Here, the motion model may be generated based on at least one of a probability-based motion model and a sensor-based motion model.

The probability-based motion model may be a model obtained by individually defining the state transition probabilities of the terminal via statistical modeling.

Therefore, the probability-based motion model is advantageous in that it may be implemented easily even if the precision of the model may be deteriorated because measurement information related to the actual movement of a pedestrian is not observed.

Meanwhile, the sensor-based motion model may be a model obtained by relatively accurately predicting the motion of a motion model in a short period of time by means of Pedestrian Dead Reckoning (PDR) technology, which uses actual measurement sensor information when a sudden change of direction occurs, as in the case of a pedestrian, or when a great change in motion state appears for a certain entity. Here, the actual measurement sensor information may be sensor information measured using a sensor such as an accelerometer, a gyroscope, or a magnetometer.

Here, the mobility terminal according to the present invention may use any type of method capable of describing the mobility characteristics of the terminal without being limited to a specific method.

Thereafter, multiple pieces of measurement information are collected from the user terminal at step S620.

Here, the multiple pieces of measurement information may include at least one of one or more pieces of wireless communication infrastructure information and sensor information that may be received from the terminal.

The collection locations at which the multiple pieces of measurement information are collected may be stored in synchronization with at least one of wireless communication infrastructure information and sensor information, which are included in the multiple pieces of measurement information.

For example, the multiple pieces of measurement information may include collection locations, Media Access Control (MAC) information and Received Signal Strength Indicator (RSSI) information for each Wi-Fi AP, collection directions, the relative locations of start and end points of collection, intensities and directions along 3 axes of a magnetometer, the atmospheric pressure of a barometer, etc.

Here, the collection directions may be an absolute orientation based on a collection path. Therefore, the collection direction may be collected once whenever the direction of the collection path through which the measurement information is collected changes. Further, the intensities and directions along the 3 axes of the magnetometer may correspond to Mx, My, Mz, yaw, etc. which are the absolute orientation based on the magnetometer.

Thereafter, a dynamic location DB satisfying a dynamic condition is extracted based on the averages and standard deviations of respective pieces of measurement information corresponding to multiple pieces of measurement information at step S630.

The dynamic location DB is intended to efficiently perform computations that are required in order to estimate the location by reducing a search range within the terminal, and may be generated by extracting only a part that satisfies the preset dynamic condition from the location DB previously constructed by the collection terminal.

In this case, averages and standard deviations for respective types of measurement information collected from respective reference locations of the location DB may mean values obtained by calculating averages and standard deviations from multiple pieces of measurement information received from the vicinity of respective reference locations.

If all reference locations are identical to the locations at which measurement information was collected, a dynamic location DB may be immediately generated using the collected measurement information without needing to perform a task for extracting the dynamic location DB from the location DB.

In this regard, the preset dynamic condition may correspond to at least one of the case where at least one reference location included in the location DB falls within a reference range preset around the location of the terminal based on multiple pieces of measurement information and the case where the standard deviation of the locations of the terminal based on the multiple pieces of measurement information falls within a preset threshold range.

Here, the preset dynamic condition may be used by combining one or more conditions under the limited condition of a search range. For example, the preset dynamic conditions may be combined such that it is primarily determined whether the standard deviation of locations of the terminal based on the multiple pieces of measurement information falls within a preset threshold range, and such that, if it is determined that the standard deviation falls within the preset threshold range, it is secondarily determined whether at least one reference location included in the location DB falls within a reference range preset around the location of the terminal based on the multiple pieces of measurement information.

Thereafter, individual likelihoods for respective multiple pieces of measurement information are calculated at step S640.

In this regard, multiple pieces of measurement information may be corrected in accordance with the collection terminal corresponding to the location DB based on the measurement information correction DB for each terminal, thus enabling multiple pieces of corrected measurement information to be generated.

For example, the case where the measurement information chipset of a collection terminal for collecting in advance measurement information to construct a location DB is different from the measurement information chipset of the user terminal, which is used to estimate the location of the terminal, may be assumed. Here, even if the collection terminal and the user terminal receive measurement information at the same location, the received signal characteristics of the terminals are different from each other, and thus the two terminals may have different pieces of measurement information. These results may cause a problem in that a false probability value is calculated when likelihoods are calculated by comparing the measurement information in the dynamic location DB with the measurement information measured by the user terminal.

Therefore, the present invention may perform a correction procedure for performing correction such that the measurement information measured by the user terminal is similar to the information collected by the collection terminal using the measurement information correction DB for each terminal, which is separately stored.

Here, the measurement information correction DB for each terminal may include at least one of bias and a scale factor of received values for each of piece of measurement information measured at the same location in different types of terminals.

As an example of the procedure using the measurement information correction DB for each terminal, the model number of the user terminal is transmitted to a server hosting the measurement information correction DB for each terminal, and is then compared with the model number of the collection terminal. Thereafter, when the two models are found to be different from each other, a correction DB that enables the difference between the two models to be corrected is searched, and measurement information corresponding to the user terminal may be corrected with the bias and scale factor using the correction DB.

A procedure for calculating multiple individual likelihoods is described below based on respective steps. First, the reference location closest to the current location of the terminal corresponding to the motion model is searched for in the dynamic location DB based on the current location of the terminal, and thus location DB values for respective pieces of measurement information may be obtained. For example, in the case of W-Fi APs, the averages and standard deviations of RSSI values for respective reception APs may be obtained in the form of $(\mu_{x_p,i}, \sigma_{x_p,i})$ and may be included in the first measurement information-based lists.

Thereafter, information is extracted for respective pieces of measurement information having different dimensions using multiple pieces of measurement information received from the user terminal. For example, in the case of Wi-Fi APs, when information for k Wi-Fi APs is received, the information may be defined to correspond to $W=\{w_1, w_2, \ldots, w_k\}$ and may be included in the second measurement information-based lists.

Then, the first measurement information-based lists corresponding to the location DB are compared with the second measurement information-based lists corresponding to measurement information collected from the terminal, and only matching information between the lists may be refined and may be used to calculate the likelihood corresponding to multiple pieces of measurement information.

Thereafter, weights proportional to a combined likelihood of the multiple pieces of measurement information are calculated by combining the multiple individual likelihoods with each other based on a preset combination formula at step S650.

For example, assuming that a total of M individual likelihoods are calculated depending on the types of measurement information, the combined likelihood corresponding to multiple pieces of measurement information may be finally calculated by combining the M individual likelihoods with each other in conformity with the following Equation (8):

$$P(W,B,M_{norm},M_{yaw}|x_t)=(P(W|x_t) \cdot P(B|x_t) \cdot P(M_{norm}|x_t) \cdot P(M_{yaw}|x_t))^{1/4} \quad (8)$$

In this case, in Equation (8), it may be assumed that the number of types of measurement information is 4, in other words, four individual likelihoods are combined and individual pieces of measurement information are independently received.

Thereafter, the weights are applied to at least one sample corresponding to the motion model at step S660. For example, new particles to be included in a particle set corresponding to the sample of the motion model may be calculated depending on probabilities proportional to the weights.

Thereafter, the direction and location of the terminal are estimated at step S670. The location and direction of the terminal may be calculated using the average of the locations and directions of the new particles.

In this case, the weights for the at least one sample value corresponding to the motion model may be calculated in proportion to the combined likelihood, that is, the likelihood corresponding to the multiple pieces of measurement information, and the weights may be normalized such that the sum thereof is 1.

In accordance with the present invention, the location of a terminal may be estimated by efficiently combining positioning resources having different dimensions with each other in a positioning algorithm.

Further, the present invention may shorten the time required to estimate the location of a terminal by limitedly calculating a dynamic DB corresponding to a current terminal from an existing location DB based on predetermined criteria.

Furthermore, the present invention may more precisely estimate the location of a user terminal by reducing an error corresponding to the difference between a measurement information collection terminal and the user terminal.

As described above, in the location estimation apparatus and method using a combination of different positioning resources according to the present invention, the configurations and schemes in the above-described embodiments are not limitedly applied, and some or all of the above embodiments can be selectively combined and configured so that various modifications are possible.

What is claimed is:

1. A location estimation apparatus using a combination of different positioning resources, comprising:
   one or more processors configured to process executable program code embodied in non-transitory computer readable storage media, the executable program code comprising:
   motion model generation program code that generates a motion model corresponding to a state variable of a terminal based on a current time;
   weight calculation program code that extracts a dynamic location database (DB) from a location DB based on multiple pieces of measurement information received from the terminal, and calculates a weight proportional to a likelihood of the multiple pieces of measurement information based on the dynamic location DB; and
   location estimation program code that estimates a location and direction of the terminal by applying the weight to at least one sample value corresponding to the motion model,
   wherein applying the weight comprises normalizing, based on a probability proportional to the weight, at least one of a location and a direction of the terminal determined using one of the respective multiple pieces of measurement information,
   wherein the multiple pieces of measurement information correspond to the at least one sample value corresponding to the motion model, and
   wherein the at least one sample value corresponding to the motion model comprises at least one of a location and a direction of the terminal anticipated by the motion model.

2. The location estimation apparatus of claim 1, wherein the weight calculation program code comprises:
   a measurement information correction program code that generates multiple pieces of corrected measurement information by correcting the multiple pieces of measurement information in accordance with a collection terminal corresponding to the location DB based on a measurement information correction DB for each terminal; and
   a likelihood combination program code that combines multiple individual likelihoods for the multiple pieces of corrected measurement information, respectively, based on a preset combination formula, and calculating a combined likelihood of the multiple pieces of measurement information.

3. The location estimation apparatus of claim 2, wherein the multiple individual likelihoods are calculated by comparing first measurement information-based lists, acquired based on any one reference location closest to a location corresponding to the motion model, with second measurement information-based lists, acquired based on the multiple pieces of corrected measurement information and by utilizing list information that matches between the first and second measurement information-based lists.

4. The location estimation apparatus of claim 2, wherein the weight calculation program code further comprises a dynamic location DB extraction program code that extracts, from the location DB, the dynamic location DB that satisfies a dynamic condition that is preset based on averages and standard deviations of respective pieces of measurement information corresponding to the multiple pieces of measurement information.

5. The location estimation apparatus of claim 2, wherein the measurement information correction DB for each terminal comprises at least one of bias and a scale factor of received values for respective pieces of measurement information measured at an identical location in different types of terminals.

6. The location estimation apparatus of claim 2, wherein the weight calculation program code further comprises a measurement information collection program code that stores the multiple pieces of measurement information by temporally synchronizing collection locations at which the multiple pieces of measurement information are collected with at least one of wireless communication infrastructure information and sensor information that are included in the multiple pieces of measurement information.

7. The location estimation apparatus of claim 1, wherein the motion model generation program code generates the motion model based on at least one of a probability-based motion model and a sensor-based motion model.

8. The location estimation apparatus of claim 4, wherein the preset dynamic condition corresponds to at least one of a case where at least one reference location included in the location DB falls within a reference range preset around a location of the terminal based on the multiple pieces of measurement information and a case where a standard deviation of the location of the terminal based on the multiple pieces of measurement information falls within a preset threshold range.

9. A location estimation method using a combination of different positioning resources, comprising:
processing executable program code embodied in non-transitory computer readable storage media by one or more processors, the executable program code comprising:
program code that generates a motion model corresponding to a state variable of a terminal based on a current time;
program code that extracts a dynamic location database (DB) from a location DB based on multiple pieces of measurement information received from the terminal, and calculates a weight proportional to a likelihood of the multiple pieces of measurement information based on the dynamic location DB; and
program code that estimates a location and direction of the terminal by applying the weight to at least one sample value corresponding to the motion model,
wherein applying the weight comprises normalizing, based on a probability proportional to the weight, at least one of a location and a direction of the terminal determined using one of the respective multiple pieces of measurement information,
wherein the multiple pieces of measurement information correspond to the at least one sample value corresponding to the motion model, and
wherein the at least one sample value corresponding to the motion model comprises at least one of a location and a direction of the terminal anticipated by the motion model.

10. The location estimation method of claim 9, wherein the program code that extracts the dynamic location DB, and calculates the weight comprises:
program code that generates multiple pieces of corrected measurement information by correcting the multiple pieces of measurement information in accordance with a collection terminal corresponding to the location DB based on a measurement information correction DB for each terminal; and
program code that combines multiple individual likelihoods for the multiple pieces of corrected measurement information, respectively, based on a preset combination formula, and then calculates a combined likelihood of the multiple pieces of measurement information.

11. The location estimation method of claim 10, wherein the multiple individual likelihoods are calculated by comparing first measurement information-based lists, acquired based on any one reference location closest to a location corresponding to the motion model, with second measurement information-based lists, acquired based on the multiple pieces of corrected measurement information and by utilizing list information that matches between the first and second measurement information-based lists.

12. The location estimation method of claim 10, wherein the program code that extracts the dynamic location DB, and calculates the weight further comprises program code that extracts, from the location DB, the dynamic location DB that satisfies a dynamic condition that is preset based on averages and standard deviations of respective pieces of measurement information corresponding to the multiple pieces of measurement information.

13. The location estimation method of claim 10, wherein the measurement information correction DB for each terminal comprises at least one of bias and a scale factor of received values for respective pieces of measurement information measured at an identical location in different types of terminals.

14. The location estimation method of claim 10, wherein the program code that extracts the dynamic location DB, and calculates the weight further comprises program code that stores the multiple pieces of measurement information by temporally synchronizing collection locations at which the multiple pieces of measurement information are collected with at least one of wireless communication infrastructure information and sensor information that are included in the multiple pieces of measurement information.

15. The location estimation method of claim 9, wherein the program code that generates the motion model generates the motion model based on at least one of a probability-based motion model and a sensor-based motion model.

16. The location estimation method of claim 12, wherein the preset dynamic condition corresponds to at least one of a case where at least one reference location included in the location DB falls within a reference range preset around a location of the terminal based on the multiple pieces of measurement information and a case where a standard deviation of the location of the terminal based on the multiple pieces of measurement information falls within a preset threshold range.

* * * * *